O. A. FORD.
PROCESS OF MAKING ARTIFICIAL FUEL.
APPLICATION FILED DEC. 16, 1909.
1,031,255.
Patented July 2, 1912.
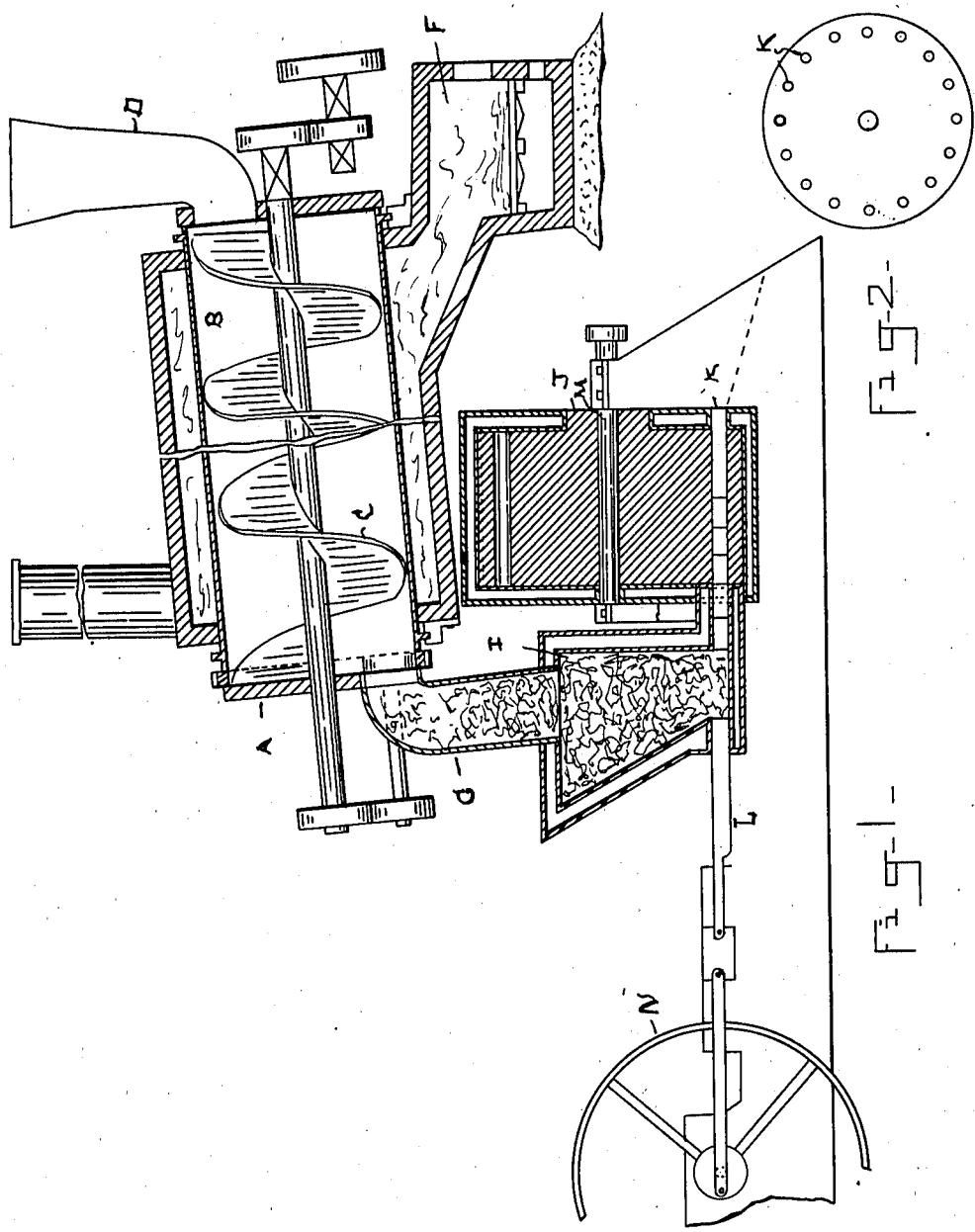
WITNESSES
INVENTOR

UNITED STATES PATENT OFFICE.

OLPHA A. FORD, OF PORTLAND, MAINE, ASSIGNOR OF ONE-HALF TO MARGARET J. THOMPSON, OF KENNEBUNK, MAINE.

PROCESS OF MAKING ARTIFICIAL FUEL.

1,031,255.

Specification of Letters Patent.

Patented July 2, 1912.

Application filed December 16, 1909. Serial No. 533,470.

*To all whom it may concern:*

Be it known that I, OLPHA A. FORD, a citizen of the United States, residing at Portland, in the county of Cumberland and State of Maine, have invented a new and useful Process of Making Artificial Fuel, of which the following is a specification.

This invention relates to improvements in process of making artificial fuel and it consists in taking moist vegetable matter and first finely dividing it while subjected to heat, whereby some of the moisture contained therein is driven off and then subjecting the resulting product to pressure while warm and allowing the same to cool in the press before the same is ejected therefrom.

The vegetable matter preferably used in this process is peat. As is well known peat is cellular in construction, the cells containing a large quantity of water which unless the peat has been dried has made it almost impossible to use the same as a successful fuel.

The object of finely dividing the peat is to thoroughly break up the many moisture containing cells in the peat so that the moisture can be driven off by the heat. During the process of heating the water in the cells is converted into steam, a portion of the same being taken out of the containing vessel by means of suction, the remaining portion being reduced to its component elements, the resulting elements uniting with the other elements in the peat. After the peat has been thoroughly macerated and the percentage of moisture having been reduced the product is then conducted to a suitable press or mold which is subjected to heat and the product is then subjected to pressure. During this pressure while the same is subjected to heat a natural binder is produced which consists of pitchy, waxy resinous substance. After the pressure has been applied the contents of the press are allowed to cool and then ejected the product being a hard compact article.

The drawing herewith accompanying and forming a part of this application, in which Figure 1 is a sectional view and Fig. 2 a detail of the revolving mold, shows a machine by which my process can be carried out.

In said drawings, A represents a casing in which is mounted a revolving cylinder or converter B. Adapted to revolve within said converter and revolving in opposite direction thereto is a conveyer C.

D is a hopper for feeding the vegetable matter to the converter. Underneath said converter is a fire box F for supplying necessary heat to the conveyer. Extending from one end of the casing is a tube G running to a suitable receptacle I, the purpose of this being to conduct the finely divided vegetable matter from the conveyer to the press. Pivotedly mounted and in connection with said receptacle I is a revolving mold J containing a multiplicity of openings K. This may be revolved in any suitable manner, the figure showing the mold mounted on a shaft M, supported on the bed of the machine and driven in any suitable manner.

L is a plunger, said plunger running through an opening in the receptacle I for the purpose of forcing the finely divided vegetable matter into the mold. The plunger L is driven by a drive wheel N to which it is eccentrically connected said drive wheel N being driven in any suitable manner.

The revolution of the mold is so timed as to receive in its openings a charge with every forward movement of the plunger, the thickness of the mold being sufficient to receive a number of charges before the compressed article is ejected therefrom. It will thus be seen that as one charge is driven against the previous one that sufficient resistance will be developed to form a hard compressed product.

Having thus described my invention and its use, I claim:

1. The process of making artificial coal which consists in finely dividing vegetable matter, then heating it to a high temperature, then while hot forming it by pressure into blocks, then transferring the blocks while under pressure to a cooling press and thoroughly cooling them in the press before expelling them.

2. The process of making artificial coal which consists in heating vegetable matter and while hot breaking up the cellular structure by mechanical means, then while hot reducing the resulting mass by pressure into blocks and then transferring the blocks into a cooling press and thoroughly cooling them in the press under pressure before expelling them.

3. The process of making artificial coal which consists in heating vegetable matter and breaking up the cellular structure by mechanical means, then subjecting the same to a degree of heat sufficient to disperse the moisture and liquefy the pitchy elements, then converting the mass while hot into blocks under pressure, and then transferring the blocks while hot and compressed into a cooling press and thoroughly cooling them in the press under pressure before expelling them.

4. The process of making artificial coal which consists in heating vegetable matter and breaking up the cellular structure by mechanical means and while hot heating the mass to a degree sufficient to convert the moisture into steam and to liquefy the pitchy elements, then withdrawing a portion of the steam and subjecting the mass to pressure while hot, whereby the cellular structure and the pitchy elements are recombined, then forming the resulting mass while hot into blocks, and then transferring the blocks still under pressure to a cooling press and thoroughly cooling them in the press before expelling them.

OLPHA A. FORD.

Witnesses:
NATHAN CLIFFORD,
CHARLES L. FOSTER.